United States Patent [19]

Blackman

[11] 4,177,682
[45] Dec. 11, 1979

[54] MECHANISM AND A METHOD FOR THE SUPPORT AND STEPWISE ROTATION OF A MEMBER

[75] Inventor: Peter G. Blackman, 14 Charlesfield Rd., Rugby, Warwickshire, England

[73] Assignees: Peter George Blackman, Rugby; Associated Electrical Industries Limited, London, both of England

[21] Appl. No.: 840,900

[22] Filed: Oct. 11, 1977

[51] Int. Cl.² ............................................. F16H 27/02
[52] U.S. Cl. ...................................... 74/128; 414/433; 414/757
[58] Field of Search ............ 248/130; 214/340, 1 QG; 74/128

[56] References Cited

U.S. PATENT DOCUMENTS

| 278,022 | 5/1883 | Kline ..................................... 214/340 |
| 1,172,883 | 2/1916 | Gammeter ........................... 248/130 |
| 3,428,199 | 2/1969 | Rhoads ............................. 214/1 QG |
| 3,480,158 | 11/1969 | Pandjiris et al. ...................... 214/340 |
| 4,032,019 | 6/1977 | Noll et al. ........................ 214/1 QG |

Primary Examiner—Samuel Scott
Assistant Examiner—Wesley S. Ratliff, Jr.
Attorney, Agent, or Firm—Kirschstein, Kirschstein, Ottinger & Cobrin

[57] ABSTRACT

A stand for supporting and rotating shafts in fractions of a revolution, for example for assembling armature slot conductors. Conventional arrangements use multiple rollers conforming to the shaft, one of which is motorized by way of gearing. This tends to be cumbersome, expensive and complex. According to this invention a shaft is supported on the walls of a channel between roller stops. A lever within the channel is jacked up to tilt the shaft against one roller and the lever is pushed longitudinally, allowing the shaft to remain in position but rolled around against the stop by an amount corresponding to the linear lever movement. The lever is then lowered and retracted.

13 Claims, 3 Drawing Figures

MECHANISM AND A METHOD FOR THE SUPPORT AND STEPWISE ROTATION OF A MEMBER

This invention relates to a mechanism for the support and stepwise rotation of a rotary member such as a machine shaft or shaft assembly.

It is a common requirement in the assembly of machines that a shaft or shaft assembly has to be rotated in a stepwise fashion through discrete revolutions or part revolutions. The assembly of blades in turbine rotors and winding sections in generator armatures are examples of such stepwise rotation requirements.

Generally shafts are supported on roller stands which have two or more rollers rotatable in the stand and located such that the shaft diameter rests between them, the shaft being rotated by the motorising of one or more of the rollers. Such stands must have an adjustment for the rollers to give a safe arc of contact to support various shaft diameters and the rollers must have adequate strength to carry the shaft weight. For the support of heavy shafts such stands are cumbersome and the necessary roller rotating machinery requires to be correspondingly substantial.

According to one aspect of the invention therefore, a mechanism for the support and stepwise rotation of a rotary member, comprises primary support means defining a stable position of the rotary member, secondary support means adapted to lift the body off the primary support means and to allow the rotary member to return to its stable position after subjecting it to a rotation determined by a linear movement of the secondary support means.

According to a second aspect of the invention, a mechanism for the support and stepwise rotation of a rotary member, comprises primary support means defining a stable position of the rotary member and secondary support means adapted to lift the rotary member off the primary support means, to move linearly a predetermined distance in a direction such as to allow the rotary member to roll on the secondary support means, and to lower the rotary member onto the primary support means in said stable position, the arrangement being such that the rotary member is subjected to a rotation determined by said predetermined distance.

The secondary support means preferably comprises a member which is adapted to tilt to engage the rotary member and lift it off the primary means, the latter including stop means against which the rotary member is urged by the tilt of the support member.

The stop means may comprise at least one free running roller.

The secondary support means may comprise a beam member adapted to move longitudinally on a lever, and may be coupled to the lever by roller bearings.

The secondary support means is preferably driven by a hydraulic or pneumatic piston.

The primary support means may comprise a beam member whose upper surface is slightly tilted to urge the rotary member against said stop means. It may also comprise stop means preventing the rotary member rolling in either direction.

The primary support means may comprise a channel member adapted to support the rotary member lying across the channel walls, said secondary support means comprising a lever mounted within the channel member, pivoted on an axis extending across the channel member and carrying, also within the channel member, a beam member which runs along the lever on roller bearings and which is wholly within the channel walls when the lever is down and projecting above them when the lever is raised.

According to a further aspect of the invention, a method of manufacturing a machine or machine subassembly which comprises a shaft member to be rotated in stepwise fashion, includes, for each stepwise rotation, the steps of supporting the shaft member on stationary support means, preventing rolling of the shaft member on the support means by stop means, levering the shaft member off the support means, rotating the shaft member against the stop means by a predetermined linear movement of a component of the lever, and lowering the shaft member onto the stationary support means.

One embodiment of a stand mechanism and a method of operating it in accordance with the invention will now be described, by way of example, with reference to the accompanying drawings, of which:

Figures 1, 2:
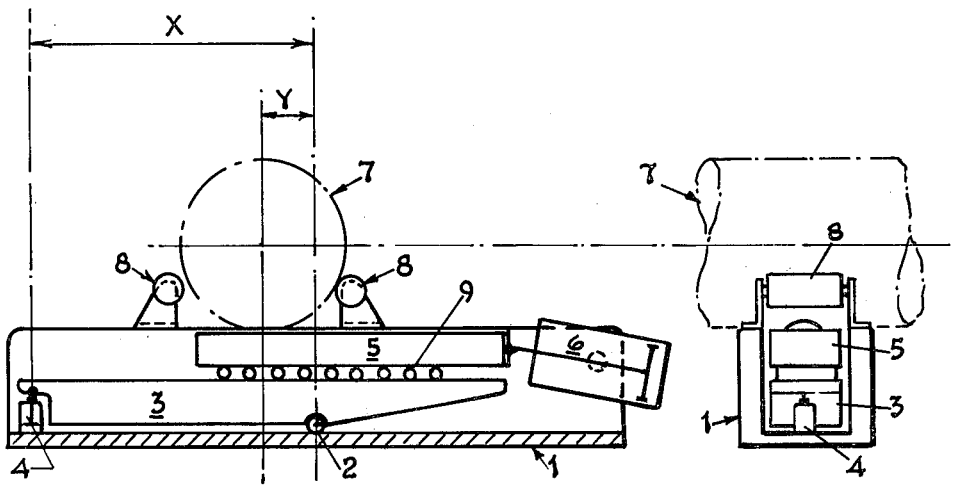
FIG. 1 is a diagrammatic sectional elevation of a shaft and stand in the normal position.
FIG. 2 is a diagrammatic end elevation corresponding to FIG. 1.

Referring to the drawings, the shaft 7 is normally supported on the side walls of a channel member 1 constituting primary support means. The shaft is prevented from rolling on the channel member 1 by roller stops 8 mounted on the channel walls. Two such stops 8 are shown, the spacing being just slightly greater than would allow them both to touch the shaft. One or both of these stops is adjustable to accommodate shafts of different diameters. One of the stops could in fact be omitted and a slight tilt given to the channel to urge the shaft 7 against the other stop. Two stops 8 are, however, desirable for safety reasons.

Two or more stands such as shown in the drawings may be used to support a shaft 7, all arranged to operate in synchronism, or alternatively, one such stand could be employed in conjunction with one or more conventional roller stands.

Figure 3:
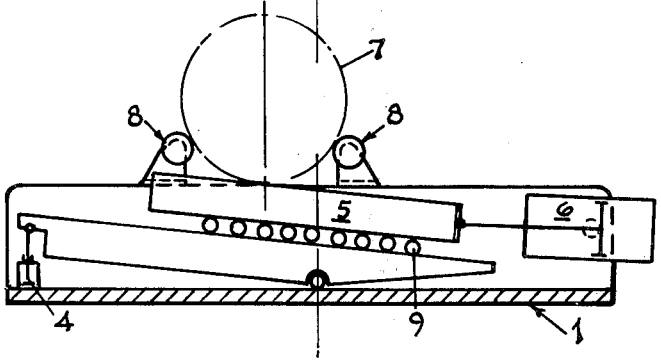
FIG. 3 is an elevation similar to FIG. 1 but in a shaft-raised position.

Mounted within the channel 1 is a lever assembly pivoted on a pivot shaft 2. The lever assembly comprises a lever 3 and a beam member 5 mounted to run longitudinally on the lever 3 on roller bearings 9. A jack 4 engages one end of the lever 3 so as to tilt it about the pivot 2. Normally, as shown in FIG. 1, the beam member 5 is just below the top of the walls of the channel member 1, and thus not quite in engagement with the shaft 7. When the jack is operated, the lever 3 tilts, as shown in FIG. 3, until the beam 5 engages the shaft 7 and lifts it just out of engagement with the walls of the channel member 1. The direction of tilt is such as to urge the shaft 7 against the same stop roller 8 that was in contact in the down position of the lever 3.

The pivot 2 and stops 8 are arranged so that the horizontal distance between the centre of gravity of the shaft 7 and the pivot 2 ('Y') is small compared to the distance between the jack 4 and pivot 2 ('X') to reduce the load on the jack. This is, of course, subject to the beam 5 being raised sufficiently to lift the shaft off the channel 1.

The beam 5 is coupled to the piston of a hydraulic ram 6, which, in the normal position shown in FIG. 1, is retracted. The ram 6 is mounted between the walls of the channel 1 on trunnions so as to require only a pivot coupling with the end of the beam 5 in its various positions. In order to make a rotational step in the position of the shaft 7 the jack 4 is first raised and when the shaft is supported off the walls of the channel 1 the ram 6 is operated. The beam 5 is pushed inwardly, i.e. 'up hill', so causing the shaft to roll on the beam 5 to maintain its 'down hill' position against the right hand stop 8. The stop 8, consisting, as it does, of a free running roller, presents no resistance to the rolling motion of the shaft.

The degree of rotation of the shaft 7 in this rolling motion is, of course, determined by the diameter of the shaft and the extent of the linear movement of the bar 5. Control of this rotation can be effected by the 'throw' of the ram piston. This can in turn be controlled either mechanically by the use of stops on the piston arm, or by control of the supply of hydraulic fluid e.g. by the use of limit switches on the beam 5.

In order that the shaft 7 does not skid on the beam 5 when carried by and rolling on it, the upper face of the beam 5 may have, or be fitted with, a high friction surface.

In order that an unbalanced shaft does not skid out of the desired position when the lever assembly is lowered out of engagement with the shaft, at least one of the upper surfaces of channel 1 may have a high friction surface or have a high friction surface fitted to it.

The mechanism is seen to be relatively simple and robust. No motorised drive and gearing is necessary and it is almost immediately suitable for any diameter shaft.

While it will generally be desirable to keep the shaft in the same place while rotating it (as in the above arrangement), it will be appreciated that in principle at least, it would be in accordance with the invention to raise the shaft 7 on the beam 5, without allowing it to roll 'downhill', shift the whole shaft by operation of the ram 6, lower the shaft back on to the channel 1, and finally allow it to roll back to its normal position against the stop 8. Again the degree of rotation will depend upon the extent of the linear movement of the beam 5.

Operation in this way would have serious disadvantages however. The rolling back stage would involve enormous inertia and it might be difficult to stop the shaft at the stop 8. In addition, the beam 5 would have to be lifted equally or its surface formed to prevent the shaft rolling on it. There might, however, be some circumstances in which this arrangement would be feasible.

I claim:

1. A mechanism for the support and stepwise rotation of a rotary member, comprising primary support means defining a stable position of said rotary member and secondary support means for lifting said rotary member off the primary support means, moving linearly a predetermined distance in a direction to allow said rotary member to roll on said secondary support means, and lowering said rotary member onto said primary support means in said stable position, the rotation of said rotary member corresponding to said predetermined distance.

2. A mechanism according to claim 1, wherein said secondary support means includes a tiltable member for tilting into engagement with said rotary member and lifting it off said primary support means, said primary support means including stop means against which said rotary member is urged by tilting said tiltable member.

3. A mechanism according to claim 2, wherein said stop means comprises at least one free running roller.

4. A mechanism according to claim 2, wherein said primary support means comprises a beam member whose upper surface is slightly tilted to urge the rotary member against said stop means.

5. A mechanism according to claim 1 including a hydraulic or pneumatic piston for driving said secondary support means linearly.

6. A mechanism according to claim 2, wherein said secondary support means comprises a tiltable beam member and a lever on which said tiltable beam member is movable longitudinally.

7. A mechanism according to claim 6 including roller bearings, said tiltable beam member being coupled to said lever by said roller bearings.

8. A mechanism according to claim 1, wherein said primary support means comprises stop means preventing said rotary member rolling in either direction.

9. A mechanism according to claim 1, wherein said primary support means comprises a channel member adapted to support said rotary member lying across the channel walls, and said secondary support means comprises a lever mounted within said channel member, pivoted on an axis extending across said channel member, and a beam member carried by said lever within said channel member, said beam member being movable along said lever on roller bearings and being wholly within the channel walls when said lever is down and projecting above said channel walls when said lever is raised.

10. A method of manufacturing a machine or machine sub-assembly including a rotary shaft member the manufacture requiring the rotation of the shaft member in stepwise fashion, the method including, for each stepwise rotation, the steps of supporting said shaft member on stationary support means, preventing rolling of said shaft member on said support means by stop means, levering said shaft member off said support means, rotating said shaft member against the stop means by a predetermined linear movement of a component of said lever, and lowering the shaft member onto said stationary support means.

11. A method according to claim 10, wherein said stop means comprises a roller to facilitate rotation of the shaft member.

12. A method according to claim 10, wherein said lever comprises a linearly movable beam member and a main body on which said beam member is mounted by means of roller bearings.

13. A method according to claim 10, wherein said component of the lever is driven by a hydraulic or pneumatic piston.

* * * * *